United States Patent
Jang

(10) Patent No.: US 11,159,226 B2
(45) Date of Patent: Oct. 26, 2021

(54) METHOD AND APPARATUS FOR IMPLEMENTING TRANSMISSION DIVERSITY USING SINGLE TRANSMITTER

(71) Applicant: Kookmin University Industry Academy Cooperation Foundation, Seoul (KR)

(72) Inventor: Byung-Jun Jang, Seoul (KR)

(73) Assignee: Kookmin University Industry Academy Cooperation Foundation, Seoul (KR)

( * ) Notice: Subject to any disclaimer, the term of this patent is extended or adjusted under 35 U.S.C. 154(b) by 0 days.

(21) Appl. No.: 16/999,622

(22) Filed: Aug. 21, 2020

(65) Prior Publication Data
US 2021/0067236 A1    Mar. 4, 2021

(30) Foreign Application Priority Data

Aug. 27, 2019 (KR) .................. 10-2019-0105357
Jul. 8, 2020 (KR) .................. 10-2020-0084265

(51) Int. Cl.
*H04L 5/12* (2006.01)
*H04L 23/02* (2006.01)
(Continued)

(52) U.S. Cl.
CPC .......... *H04B 7/0891* (2013.01); *H04B 7/028* (2013.01); *H04B 7/0697* (2013.01)

(58) Field of Classification Search
CPC .... H04B 7/0891; H04B 7/028; H04B 7/0697; H04B 7/0669; H04L 1/0618
(Continued)

(56) References Cited

U.S. PATENT DOCUMENTS 5,952,971 A * 9/1999 Strickland ................ H01Q 1/38
                                                   343/700 MS
7,356,090 B2   4/2008 Hwang et al.
(Continued)

FOREIGN PATENT DOCUMENTS

KR   10-2004-0062335 A    7/2004
KR   10-2006-0112148 A   10/2006
(Continued)

OTHER PUBLICATIONS

Korean Office Action dated Jun. 24, 2020, issued in Korean Patent Application No. 10-2019-0105357.
(Continued)

*Primary Examiner* — Tanmay K Shah
(74) *Attorney, Agent, or Firm* — Jefferson IP Law, LLP

(57) ABSTRACT

A method and an apparatus for implementing transmission diversity using a single transmitter in a wireless communication system are provided. The method of operating a transmitter for transmission diversity in a wireless communication system includes generating a first data symbol by receiving a baseband signal from a data source, generating a second data symbol having an equal phase to the first data symbol, generating a first complex conjugate symbol by performing a complex conjugate operation for the first data symbol, generating a second complex conjugate symbol having a phase difference of 180 degrees from the first complex conjugate symbol, transmitting the first data symbol through a first transmission antenna and transmitting the second data symbol through a second transmission antenna in a first time slot, and transmitting the first complex conjugate symbol through the first transmission antenna and transmitting the second complex conjugate symbol through the second transmission antenna in a second time slot.

17 Claims, 13 Drawing Sheets

(51) Int. Cl.
  *H04B 7/08*  (2006.01)
  *H04B 7/02*  (2018.01)
  *H04B 7/06*  (2006.01)

(58) Field of Classification Search
  USPC ............................................................ 375/262
  See application file for complete search history.

(56)          References Cited

U.S. PATENT DOCUMENTS 7,587,170 B1 *  9/2009  Lee .................... H04B 1/1653
                                                 455/214
  8,270,503 B2 *  9/2012  Liu .................... H04L 27/2657
                                                 375/260
  9,048,911 B2    6/2015  Stadelmeier et al.
  2004/0057530 A1 * 3/2004  Tarokh ................ H04L 1/1893
                                                 375/267
  2004/0116077 A1 * 6/2004  Lee .................... H04L 1/0618
                                                 455/101
  2010/0040164 A1 * 2/2010  Castelain ............. H04B 7/0667
                                                 375/267
  2015/0311962 A1 * 10/2015 Maltsev .............. H04B 7/0689
                                                 375/267
  2020/0162085 A1   5/2020  Chung

FOREIGN PATENT DOCUMENTS

KR    10-2010-0087714 A    8/2010
  KR    10-2020-0060210 A    5/2020

OTHER PUBLICATIONS

Siavash M. Alamouti, A Simple Transmit Diversity Technique for Wireless Communications, IEEE Journal on Select Areas in Communications, vol. 16, No. 8, Oct. 1998.
Lee et al., Performance Evaluation of OFDM Systems with Antenna Diversity, 2019.
Messier et al., A Space-Time Coding Scheme Utilizing Phase Shifting Antennas at RF Frequencies, 2005.
Korean Office Action dated May 21, 2021, issued in Korean Application No. 10-2020-0084265.

* cited by examiner

METHOD AND APPARATUS FOR IMPLEMENTING TRANSMISSION DIVERSITY USING SINGLE TRANSMITTER

CROSS-REFERENCE TO RELATED APPLICATION(S)

This application is based on and claims priority under 35 U.S.C. § 119(a) of a Korean patent application number 10-2019-0105357, filed on Aug. 27, 2019, in the Korean Intellectual Property Office, and of a Korean patent application number 10-2020-0084265, filed on Jul. 8, 2020, in the Korean Intellectual Property Office, the disclosure of each of which is incorporated by reference herein its entirety.

BACKGROUND

1. Field

The disclosure relates to a method and an apparatus for implementing transmission diversity using a single transmitter in a wireless communication system.

2. Description of Related Art

In a mobile communication environment, a sum of multi-path signals having different amplitudes and phases is received, and thus a quality of a received signal may be significantly reduced due to multi-path fading.

Accordingly, various diversity schemes have been researched to improve a communication quality, and particularly much research on a transmission diversity scheme in a downlink (DL) from a base station to a terminal has been conducted.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for implementing transmission diversity using a single transmitter, a single processor for processing a baseband signal, and a phase adjustment coupler.

Additional aspects will be set forth in part in the description which follows and, in part, will be apparent from the description, or may be learned by practice of the presented embodiments.

In accordance with an aspect of the disclosure, a method of operating a transmitter for transmission diversity in a wireless communication system is provided. The method includes generating a first data symbol by receiving a baseband signal from a data source, generating a second data symbol having an equal phase to the first data symbol, generating a first complex conjugate symbol by performing a complex conjugate operation for the first data symbol, generating a second complex conjugate symbol having a phase difference of 180 degrees from the first complex conjugate symbol, transmitting the first data symbol through a first transmission antenna and transmitting the second data symbol through a second transmission antenna in a first time slot, and transmitting the first complex conjugate symbol through the first transmission antenna and transmitting the second complex conjugate symbol through the second transmission antenna in a second time slot.

In accordance with another aspect of the disclosure, a transmitter for transmission diversity in a wireless communication system is provided. The transmitter includes a processor, a phase adjustment coupler connected to the processor to operate and including a switch circuit and a coupler circuit, and a first transmission antenna and a second transmission antenna connected to the phase adjustment coupler to operate, wherein the processor is configured to generate a first data symbol by receiving a baseband signal from a data source and generate a first complex conjugate symbol by performing a complex conjugate operation for the first data symbol, the phase adjustment coupler is configured to generate a second data symbol having an equal phase to the first data symbol and generate a second complex conjugate symbol having a phase difference of 180 degrees from the first complex conjugate symbol, the first data symbol is transmitted through the first transmission antenna and the second data symbol is transmitted through the second transmission antenna in a first time slot, and the first complex conjugate symbol is transmitted through the first antenna and the second complex conjugate symbol is transmitted through the second antenna in a second time slot.

In accordance with another aspect of the disclosure, a method of operating a receiver for transmission diversity in a wireless communication system is provided. The method includes receiving a first data symbol and a second data symbol in a first time slot, receiving a first complex conjugate symbol and a second complex conjugate symbol in a second time slot, and reconstructing a data symbol to which transmission diversity is applied, based on the first data symbol, the second data symbol, the first complex conjugate symbol, and the second complex conjugate symbol, wherein the first data symbol and the second data symbol have an equal phase, the first complex conjugate symbol and the second complex conjugate symbol have a phase difference of 180 degrees, and the first complex conjugate symbol is generated by performing a complex conjugate operation for the first data symbol.

The disclosure discloses an apparatus and a method for implementing transmission diversity only through a single processor for processing a baseband signal.

The disclosure discloses an apparatus and a method for implementing transmission diversity having small power consumption.

The disclosure has an effect of securing a low Bit Error Rate (BER) while applying transmission diversity in a simple structure.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
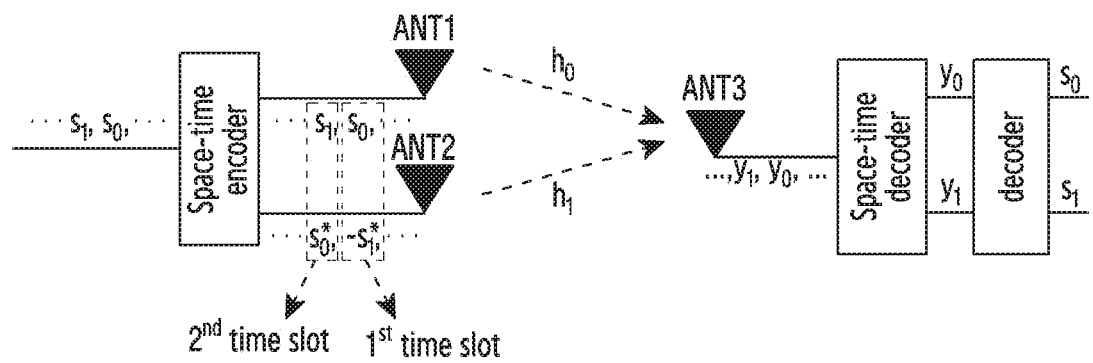
FIG. 1 is a block diagram of a transmission diversity method according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Various embodiments according to the technical idea of the disclosure are provided to more completely explain the technical idea of the disclosure, and various modifications and changes may be made thereto. The scope of the technical idea of the disclosure is not limited to embodiments set forth below, and these embodiments are rather provided to make the disclosure more complete and perfect and fully transfer the technical idea of the disclosure to those skilled in the art.

As used herein, such terms as "a first" and "a second" are used to describe various members, regions, layers, portions, and/or elements, but it will be apparent that these members, regions, layers, portions, and/or elements are not limited by such terms. Such terms do not mean specific order, rank, or superiority, and are used only to distinguish one member, region, portion, or element from another. Therefore, in the following description, a first member, region, portion, or element may refer to a second member, region, portion, or element without departing from the teaching of the technical idea of the disclosure. For example, a first element may be termed a second element, and similarly, a second element may be termed a first element without departing from the scope of the disclosure.

Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure.

As used herein, the term "and/or" includes each one of members enumerated together and all possible combinations of one or more of the members.

Hereinafter, embodiments of the disclosure will be described in detail with reference to the accompanying drawings.

FIG. 1 is a block diagram illustrating a transmission diversity method according to an embodiment of the disclosure.

Referring to FIG. 1, when a data symbol transmitted by a first transmission antenna (ANT1) is $s_0$ in a first time slot and $s_1$ in a second time slot, the data symbol as shown in Equation 1 may be transmitted through the first antenna and a second antenna (ANT1 and ANT2).

According to an embodiment, when the data symbol is transmitted, orders of the data symbols may be shuffled using a space-time encoder block, and the data symbols may be transformed through a complex conjugate or a negative (−) operation and transmitted by a first antenna and a second antenna (ANT1 and ANT2).

$$\begin{bmatrix} s_0 & s_1 \\ -s_1^* & s_0^* \end{bmatrix} \quad \text{Equation 1}$$

Specifically, the first data symbol ($s_0$) is transmitted through the first antenna (ANT1) and $-s_1^*$ that is transformed from the second data symbol is transmitted through the second antenna (ANT2) during a first time slot interval. In a second time slot interval, the sequences are exchanged, and thus $s_1$ may be transmitted in the first antenna and $s_0^*$ may be transmitted in the second antenna.

When the data symbol is received through a third antenna (ANT3), a received signal $y^k$ in a $k^{th}$ time slot may be given as shown in Equation 2 and Equation 3. $n^k$ denotes Additive White Gaussian 1Noise (AWGN) in the $k^{th}$ time slot. When a channel characteristic from the first antenna (ANT1) to the reception antenna (ANT3) is defined as $h^1$ and a channel characteristic from the second antenna (ANT2) to the reception antenna (ANT3) as $h_2$, $y^k$ may be defined by Equation 2 and Equation 3.

$$y^1 = h_0 s_0 + h_1(-s^*_1) + n^1 \qquad \text{Equation 2}$$

$$y^2 = h^*_0 s^*_1 + h_1 s^*_0 + n^2 \qquad \text{Equation 3}$$

Equation 4 below may be derived through summarization of Equation 2 and Equation 3.

$$\begin{bmatrix} y^1 \\ y^2 \end{bmatrix} = \begin{bmatrix} h_0 & -h_1 \\ h_1^* & h_0^* \end{bmatrix} \begin{bmatrix} s_0 \\ s_1^* \end{bmatrix} + \begin{bmatrix} n^1 \\ n^{2*} \end{bmatrix} \qquad \text{Equation 4}$$

Equation 4 is summarized using Equation 5 and Equation 6.

$$H = \begin{bmatrix} h_0 & -h_1 \\ h_1^* & h_0^* \end{bmatrix} \begin{bmatrix} s_0 \\ s_1^* \end{bmatrix} \qquad \text{Equation 5}$$

$$H^+ = (H^H H)^{-1} H^H \qquad \text{Equation 6}$$

The transmitted data symbol may be estimated as shown in Equation 7.

$$\begin{bmatrix} \hat{s}_0 \\ \hat{s}_1^* \end{bmatrix} = H^+ \begin{bmatrix} y^1 \\ y^{2*} \end{bmatrix} \qquad \text{Equation 7}$$

$$= (H^H H)^{-1} H^H H \begin{bmatrix} s_0 \\ s_1^* \end{bmatrix} + (H^H H)^{-1} H^H \begin{bmatrix} n^1 \\ n^{2*} \end{bmatrix}$$

$$= \begin{bmatrix} s_0 \\ s_1^* \end{bmatrix} + (H^H H)^{-1} H^H \begin{bmatrix} n^1 \\ n^{2*} \end{bmatrix}$$

In Equation 7, $H^+$ denotes a pseudo inverse of H and may be calculated as $H^+ = (H^H H)^{-1} H^H$ through a Hamiltonian matrix.

However, in an embodiment illustrated in FIG. 1, data symbols are non-sequentially transmitted in no particular order, so that implementation cannot be directly performed in a Radio Frequency (RF) band. Further, since a complex conjugate operation of the data symbol cannot be implemented by an RF circuit, an embodiment illustrated in FIG. 1 always needs two transmitters.

Since two transmitters are used, the hardware configuration is complex and price, power consumption, and production cost also increase. Further, since the two transmitters should be synchronized, there is a disadvantage in that an additional clock distribution circuit is needed. If only one transmitter is used even though transmission diversity is implemented, transmission diversity can be used even in various application fields that could not use transmission diversity due to a low power problem.

Hereinafter, the disclosure discloses a method and an apparatus for implementing transmission diversity using a single receiver in order to solve the problem.

Figure 2:
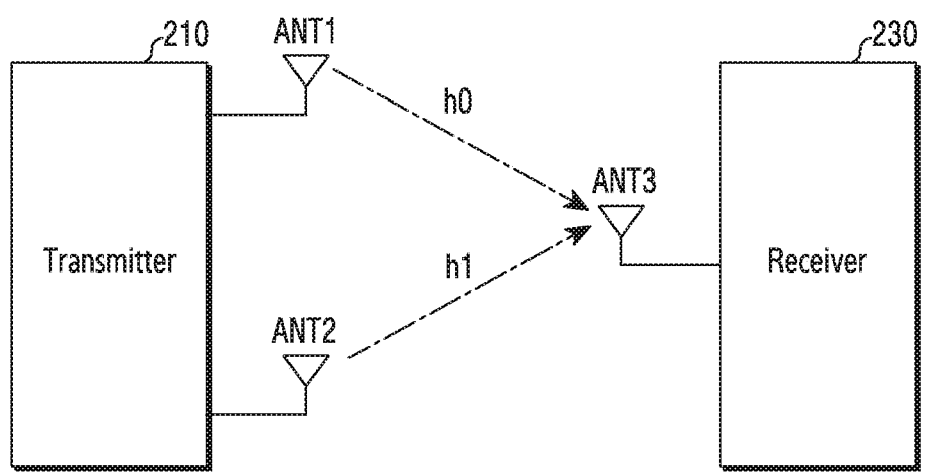
FIG. 2 is a block diagram of a communication system according to an embodiment of the disclosure.

FIG. 2 is a block diagram of a communication system according to an embodiment of the disclosure.

Two transmission antennas (ANT1 and ANT2) and one receiver antenna (ANT3) illustrated in FIG. 2 are only an example, but the number of antennas is not limited thereto and may vary.

Referring to FIG. 2, the communication system may include a transmitter 210 and a receiver 230.

The transmitter 210 may have a plurality of antennas (ANT1 and ANT2) and may implement transmission diversity using data symbols transmitted through the plurality of antennas (ANT1 and ANT2). A data symbol transmitted through the first antenna (ANT1) of the transmitter 210 may be received through a third antenna (ANT3) of the receiver 230 according to a first channel characteristic ($h_0$), and a data symbol transmitted through the second antenna (ANT2) of the transmitter 210 may be received through the third antenna (ANT3) of the receiver 230 according to a second channel characteristic ($h_1$). The receiver 230 may reconstruct the original data symbol transmitted from the transmitter 210 through data symbols received by the third antenna (ANT3) through various paths.

According to an embodiment, the plurality of antennas (ANT1 and ANT2) of the transmitter 210 may be implemented as Single Resonator Multiple Mode (SRMM) antennas. The SRMM antenna refers to an antenna in which two antennas having multiple modes are integrated in one antenna structure. Through the use of the SRMM antenna, a problem of increasing the antenna may be solved.

According to an embodiment, the transmitter 210 and the receiver 230 may be a device for transmitting data and a device for receiving data on the basis of a downlink (DL) but are not limited thereto.

Figure 3:
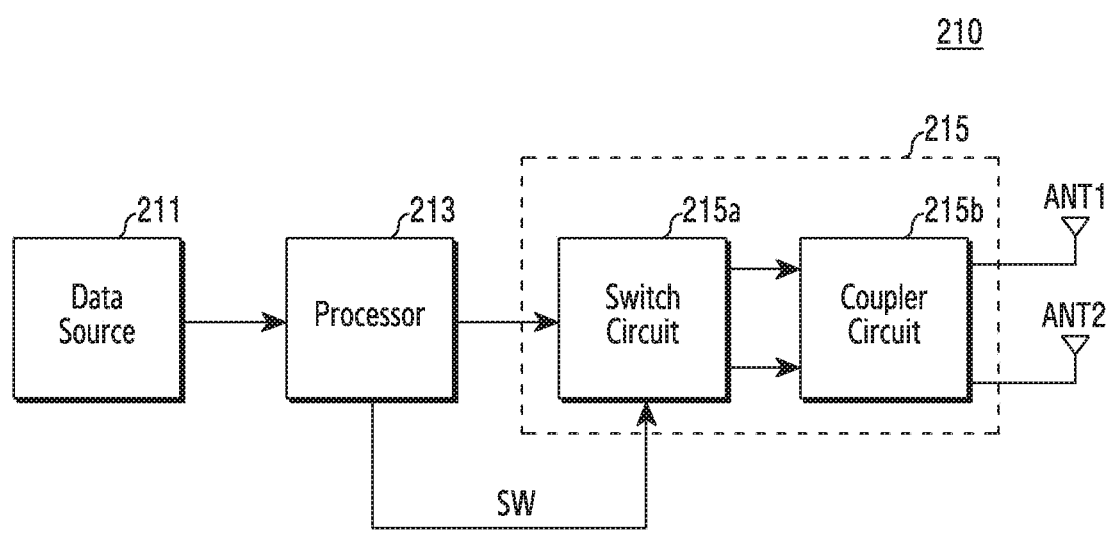
FIG. 3 is a block diagram of a transmitter according to an embodiment of the disclosure.

FIG. 3 is a block diagram of a communication system according to an embodiment of the disclosure.

Referring to FIG. 3, the transmitter 210 may include a data source 211, a processor 213, a phase adjustment coupler 215, and a plurality of antennas (ANT1 and ANT2).

The data source 211 is a node or a network providing data and may be, for example, a node or a network supplying a baseband signal such as a core network of a base station, a backhaul, or the base station itself.

The processor 213 may perform various operation processing for the baseband signal received from the data source 211. The processor 213 may perform various signal processing such as repetitive generation of the baseband signal received from the data source 211 and a complex conjugate operation for the received baseband signal. The processor 213 may generate an RF signal in the form of a data symbol according to the result of signal processing. According to an embodiment, the processor 213 may be variously referred to as a baseband processor, and a separate controller (not shown) or processor (not shown) for controlling the overall operation of the transmitter 210 may be provided according to occasions.

The processor 213 may generate a switching signal (SW) for switching a switch circuit 215a within the phase adjustment coupler 215. A detailed operation of the switch circuit 215a according to the switching signal (SW) will be described below with reference to FIG. 4.

The phase adjustment coupler 215 may couple data symbols transmitted from the processor 213 and adjust and output phases of the coupled data symbols.

The phase adjustment coupler 215 may include the switch circuit 215a and a coupler circuit 215b.

Figure 4:
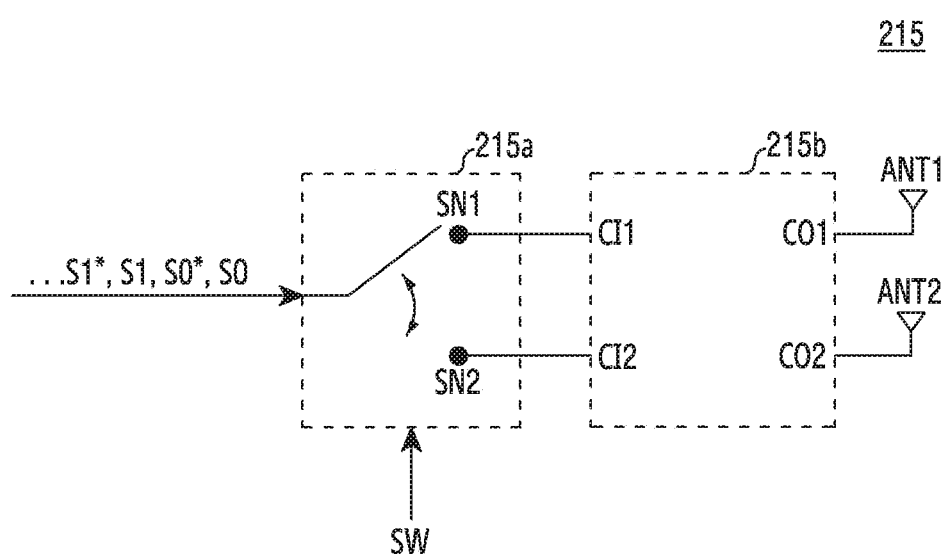
FIG. 4 illustrates a phase adjustment coupler according to an embodiment of the disclosure.

FIG. 4 illustrates a phase adjustment coupler according to an embodiment of the disclosure.

Referring to FIG. 4, the switch circuit 215a may switch a signal path of data symbols (for example, $s_0$, $s^*_0$, $s_1$, and $s^*_1$) transmitted from the processor 213.

The switch circuit 215a may switch a signal path between a first switching node (SN1) and a second switching node (SN2) according to a switching signal (SW) transmitted from the processor 213.

According to an embodiment, the switch circuit 215a may alternately switch the signal path between the first switching node (SN1) and the second switching node (SN2) in successive time slots.

The coupler circuit 215b may include a plurality of input terminals (CI1 and CI2) and a plurality of output terminals (CO1 and CO2).

According to an embodiment, when the signal path is determined as the first switching node (SN1) by the switch circuit 215a, the data symbol (for example, S0) transmitted from the processor 213 may be input into the first input terminal (CI1) of the coupler circuit 215b.

According to an embodiment, when the signal path is determined as the second switching node (SN2) by the switch circuit 215a, the data symbol (for example, S0*) transmitted from the processor 213 may be input into the second input terminal (CI2) of the coupler circuit 215b.

According to an embodiment, the data symbol input into one of the plurality of input terminals (CI1 and CI2) of the coupler circuit 215b may be coupled via different signal paths in the coupler circuit 215b and then each of the coupled data symbols may be output to each of the plurality of output terminals (CO1 and CO2) of the coupler circuit 134.

According to an embodiment, the data symbol (for example, $s_0$) input into the first input terminal (CI1) of the coupler circuit 215b may be coupled to be data symbols (for example, $s_0$ and $s_0$) having the same phase as the input data symbol (for example, $s_0$) and output to the plurality of output terminals (CO1 and CO2), respectively.

According to an embodiment, the data symbol (for example, $s^*_0$) input into the second input terminal (CI2) of the coupler circuit 215b may be coupled to be the data symbol (for example, $s^*_0$) having the same phase as the input data symbol (for example, $s^*_0$) and a data symbol (for example, $-s^*_0$) having only a phase difference of 180 degrees and output to the plurality of output terminals (CO1 and CO2), respectively.

According to an embodiment, the coupler circuit 215b may be implemented as a 180-degree hybrid coupler, in which case the first input terminal (CI1) may be a sum terminal for coupling the input signal to be two signals having the same phase and outputting the two signals and the second input terminal (CI2) may be a difference terminal for coupling the input signal to be two signals having a phase difference of 180 degrees therebetween and outputting the two signals.

Figure 5:
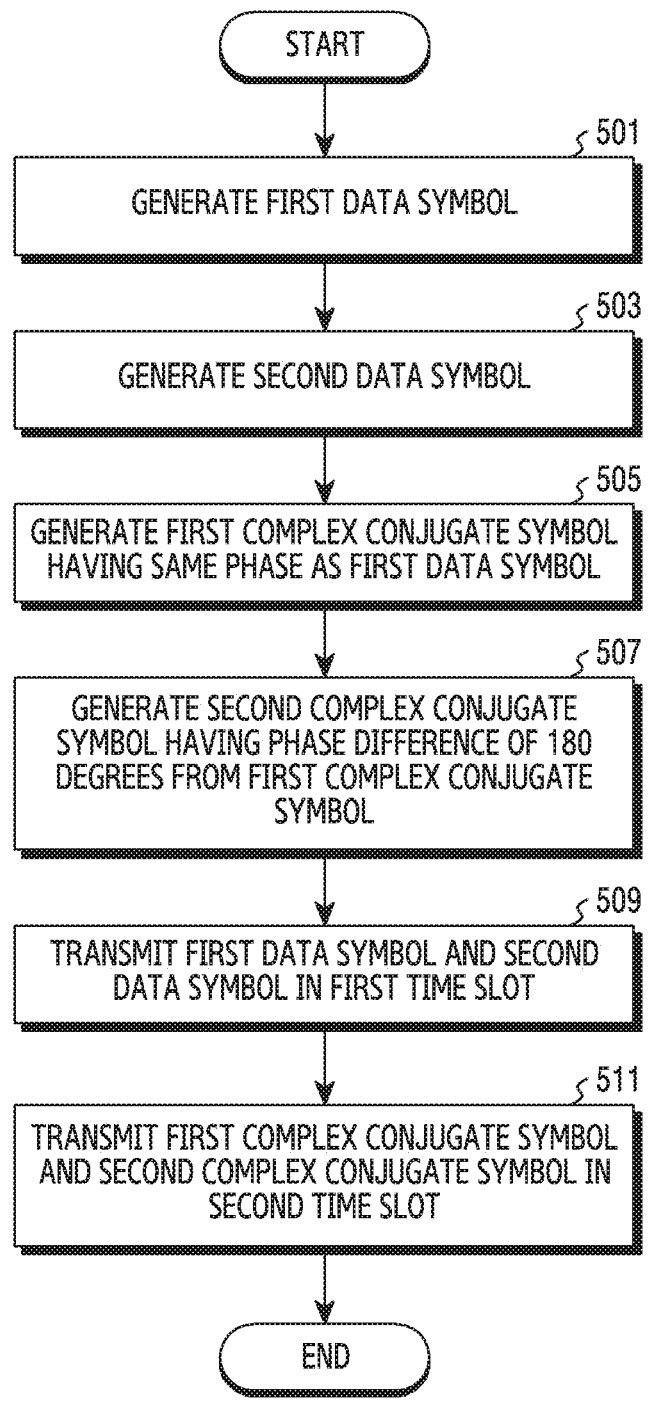
FIG. 5 is a flowchart illustrating an operation of a transmitter to which transmission diversity is applied according to an embodiment of the disclosure.

FIG. 5 is a flowchart illustrating the operation of a transmitter to which transmission diversity is applied according to an embodiment of the disclosure.

Referring to FIG. 5, operations 501, 503, 505, 507, 509 and 511 of FIG. 5 may be performed by the transmitter 210 of the communication system according to an embodiment.

In operation 501, the transmitter 210 may receive a baseband signal from the data source 211 and generate a first data symbol.

According to an embodiment, the transmitter 210 may include the processor 213 and perform various signal processing such as repetitive generation of the baseband signal received from the data source 211 and the complex conjugate operation for the received baseband signal by the processor 213.

In operation 503, the transmitter 210 may generate a second data symbol having the same phase as the first data symbol.

According to an embodiment, when the first data symbol is $s_0$, the first data symbol (for example, $s_0$) may be input into the first input terminal (CI1) of the coupler circuit 215b through the first switching node (SN1) according to the switching operation of the switch circuit 215a in a first time slot, coupled to be second data symbols (for example, $s_0$) having the same phase as the first data symbol (for example, S0) via a signal path in the coupler circuit 215b, and output to the plurality of output terminals (CO1 and CO2).

According to an embodiment, the output first data symbol and second data symbol (for example, $s_0$) may be transmitted to the outside in parallel through the first transmission antenna and the second transmission antenna (ANT1 and ANT2), respectively.

In operation 505, the transmitter 210 may perform the complex conjugate operation for the first data symbol (for example, S0) transmitted in operation 501 and generate a first complex conjugate symbol (for example, $s^*_0$).

According to an embodiment, operation 505 may be performed by the processor 213 of the transmitter 210, and the first complex conjugate symbol (for example, $s^*_0$) may be generated by performing a complex conjugate operation after temporarily storing the first data symbol (for example, $s_0$).

According to operation 507, the transmitter 210 may generate a second complex conjugate symbol (for example, $-s^*_0$) having a phase difference of 180 degrees from the first complex conjugate symbol ($s^*_0$).

According to an embodiment, when the first complex conjugate symbol is S0*, the first complex conjugate symbol (for example, $s^*_0$) may be input into the second input terminal (CI2) of the coupler circuit 134 through the second switching node (SN2) according to the switching operation of the switching circuit 132 in a second time slot, coupled to be the second data symbol (for example, $-s^*_0$) having only a phase difference of 180 degrees from the first complex conjugate symbol (for example, $s^*_0$) via a signal path in the coupler circuit 134, and output to the plurality of output terminals (CO1 and CO2), respectively.

In operation 509, the output first data symbol (for example, $s_0$) and second data symbol (for example, $s_0$) may be transmitted to the outside in parallel through the first transmission antenna and the second transmission antenna (ANT1 and ANT2), respectively, in the first time slot.

In operation 511, the output first complex conjugate symbol (for example, $s^*_0$*) and second complex conjugate symbol (for example, $-s^*_0$) may be transmitted to the outside in parallel through the first transmission antenna and the second transmission antenna (ANT1 and ANT2), respectively, in the second time slot.

According to an embodiment, the first time slot and the second time slot are temporally continuous time slots.

According to an embodiment, first transmission data symbols and second transmission data symbols may be transmitted after application of time-space block encoding. Accordingly, it is possible to improve reliability of data transmission through the use of data of various versions received after transmission of several copies of a data stream through a plurality of antennas.

Figure 6:
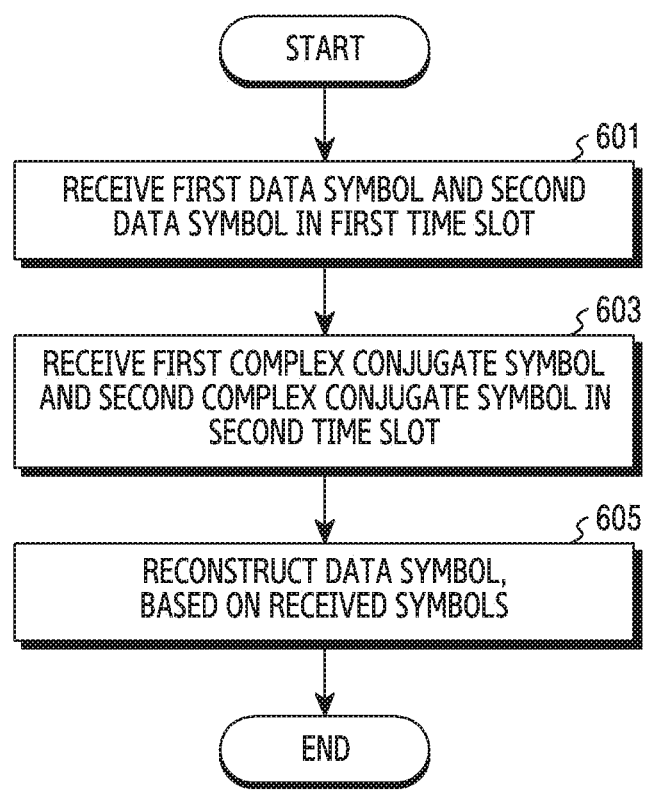
FIG. 6 is a flowchart illustrating an operation of a receiver to which transmission diversity is applied according to an embodiment of the disclosure.

FIG. 6 is a flowchart illustrating the operation of a receiver to which transmission diversity is applied according to an embodiment of the disclosure.

Referring to FIG. 6, operations 601, 603 and 605 of FIG. 6 may be performed by the receiver 230 of the communication system according to an embodiment.

In operation 601, the receiver 230 may receive a first data symbol and a second data symbol having the same phase as the first data symbol in a first time slot.

According to an embodiment, the receiver 230 may receive data symbols (for example, S0 and S0) having the same phase as each other in the first time slot.

In operation 603, the receiver 230 may receive a first complex conjugate symbol and a second complex conjugate symbol having only a phase difference of 180 degrees from the first complex conjugate symbol.

According to an embodiment, the first complex conjugate symbol may be generated by performing a complex conjugate operation for the first data symbol.

According to an embodiment, the receiver 230 may receive the first complex conjugate symbol and the second complex conjugate symbol (for example, $s^*_0$ and $-s^*_0$) having only a phase difference of 180 degrees from each other in a second time slot, and the first complex conjugate symbol (for example, $s^*_0$) among the first complex conjugate symbol and the second complex conjugate symbol (for example, $s^*_0$ and $-s_0$) may have a complex conjugate relation with the first data symbol (for example, $s_0$).

In operation 605, the receiver 230 may reconstruct the data symbol to which transmission diversity is applied on the basis of the first data symbol and the second data symbol (for example, $s_0$ and $s_0$) and the first complex conjugate symbol and the second complex conjugate symbol (for example, $s^*_0$ and $-s^*_0$).

According to an embodiment, operation 605 may be performed by a processor (not shown) included in the receiver 100 or a baseband signal processor (not shown).

According to an embodiment, a process in which the receiver 230 reconstruct the data symbols to which transmission diversity is applied on the basis of the first data symbol and the second data symbol (for example, $s_0$ and $s_0$) and the first complex conjugate symbol and the second complex conjugate symbol (for example, S0* and −S0*) may be performed as follows.

According to an embodiment, a reception signal $y^k$ received by the receiver 230 may be indicated in the form as shown in Equation 8 and Equation 9.

$$y^1 = h_0 s_0 + h_1 s_0 + n^1 \quad \text{Equation 8}$$

$$y^2 = h_0(-s^*_0) + h_1 s^*_0 + n^2 \quad \text{Equation 9}$$

($y^k$ denotes a reception signal in a $k^{th}$ time slot, $h_n$ denotes a channel characteristic of an nth channel, $s_0$, $s^*_0$, and $-s^*_0$ denote transmission data symbols, and $n^k$ denotes Additive White Gaussian Noise (AWGN) in a $k^{th}$ time slot)

At this time, Equation 10 may be derived after a complex conjugate of Equation 9 is obtained and expressed as a matrix.

$$\begin{bmatrix} y^1 \\ y^{2*} \end{bmatrix} = \begin{bmatrix} h_o & -h_1 \\ h_1^* & -h_o^* \end{bmatrix} \begin{bmatrix} s_0 \\ s_0 \end{bmatrix} + \begin{bmatrix} n^1 \\ n^{2*} \end{bmatrix} \quad \text{Equation 10}$$

$$H_{2\times1} = \begin{bmatrix} h_0 & h_1 \\ h_1^* & -h_0^* \end{bmatrix}$$

may be defined, and when Equation 10 is solved for $$\begin{bmatrix} s_0 \\ s_0 \end{bmatrix},$$

a transmitted data symbol may be estimated as shown in Equation 11. $H^+$ denotes a pseudo inverse of a matrix H.

$$\begin{bmatrix} \hat{s}_0 \\ s_0 \end{bmatrix} = H^+_{2\times1} \begin{bmatrix} y^1 \\ y^{2*} \end{bmatrix} \quad \text{Equation 11}$$

$$= (H^H_{2\times1} H_{2\times1})^{-1} H^H_{2\times1} H_{2\times1} \begin{bmatrix} s_0 \\ s_0 \end{bmatrix} +$$

$$(H^H_{2\times1} H_{2\times1})^{-1} H^H_{2\times1} \begin{bmatrix} n^1 \\ n^{2*} \end{bmatrix}$$

$$= \begin{bmatrix} s_0 \\ s_0 \end{bmatrix} + (H^H_{2\times1} H_{2\times1})^{-1} H^H_{2\times1} \begin{bmatrix} n^1 \\ n^{2*} \end{bmatrix}$$

In Equation 11, only a symbol is repeated in an Alamouti code, and Equation 11 may be processed using at least some of the receiver structure in which an existing Alamouti transmission diversity signal can be processed according to an embodiment.

According to an embodiment, when two reception antennas are used, a reception signal may be expressed as Equation 12 and Equation 13. $y_i^k$ denotes a signal of an $i^{th}$ reception antenna in a k(k=1, 2)$^{th}$ time slot. $h_j$ denotes a channel coefficient from a $j^{th}$ transmission antenna to an $i^{th}$ reception antenna, and $n_i^k$ denotes additive Gaussian white noise in a $k^{th}$ time slot of a signal received by an $i^{th}$ reception antenna.

$$y_0^1 = h_{00} s_0 + h_{01} s_0 + n_0^1$$

$$y_1^1 = h_{00} s_0 + h_{11} s_0 + n_1^1 \quad \text{Equation 12}$$

$$y_0^2 = h_{00}(-s^*_0) + h_{01} s^*_0 + n_0^2$$

$$y_1^2 = -h_{10}(s^*_0) + h_{11} s^*_0 + n_1^2 \quad \text{Equation 13}$$

Equation 7 may be derived by performing a complex conjugate operation for both sides of Equation 14 and summarizing it again.

$$\begin{bmatrix} y_0^1 \\ y_1^1 \\ y_0^{2*} \\ y_1^{2*} \end{bmatrix} = \begin{bmatrix} h_{00} & h_{01} \\ h_{10} & h_{11} \\ h_{01}^* & -h_{00}^* \\ h_{11}^* & -h_{10} \end{bmatrix} \begin{bmatrix} s_0 \\ s_0 \end{bmatrix} + \begin{bmatrix} n_0^1 \\ n_1^1 \\ n_0^{2*} \\ n_1^{2*} \end{bmatrix} \quad \text{Equation 14}$$

When $$H_{2\times2} = \begin{bmatrix} h_{00} & h_{01} \\ h_{10} & h_{11} \\ h_{01}^* & -h_{00}^* \\ h_{11}^* & -h_{10} \end{bmatrix}$$

is defined and Equation 14 is solved using a pseudo inverse matrix for $$\begin{bmatrix} s_0 \\ s_0 \end{bmatrix},$$

a symbol may be estimated as shown in Equation 15 below.

$$\begin{bmatrix} \hat{s}_0 \\ \hat{s}_0 \end{bmatrix} = H_{2\times 2}^+ \begin{bmatrix} y_0^1 \\ y_1^1 \\ y_0^{2*} \\ y_1^{2*} \end{bmatrix}$$ Equation 15

$$= (H_{2\times 2}^H H_{2\times 2})^{-1} H_{2\times 2}^H H_{2\times 2} \begin{bmatrix} s_0 \\ s_0 \end{bmatrix} +$$

$$(H_{2\times 2}^H H_{2\times 2})^{-1} H_{2\times 2}^H \begin{bmatrix} n_0^1 \\ n_1^1 \\ n_0^{2*} \\ n_1^{2*} \end{bmatrix}$$

$$= \begin{bmatrix} s_0 \\ s_0 \end{bmatrix} + (H_{2\times 2}^H H_{2\times 2})^{-1} H_{2\times 2}^H \begin{bmatrix} n_0^1 \\ n_1^1 \\ n_0^{2*} \\ n_1^{2*} \end{bmatrix}$$

Figure 7:
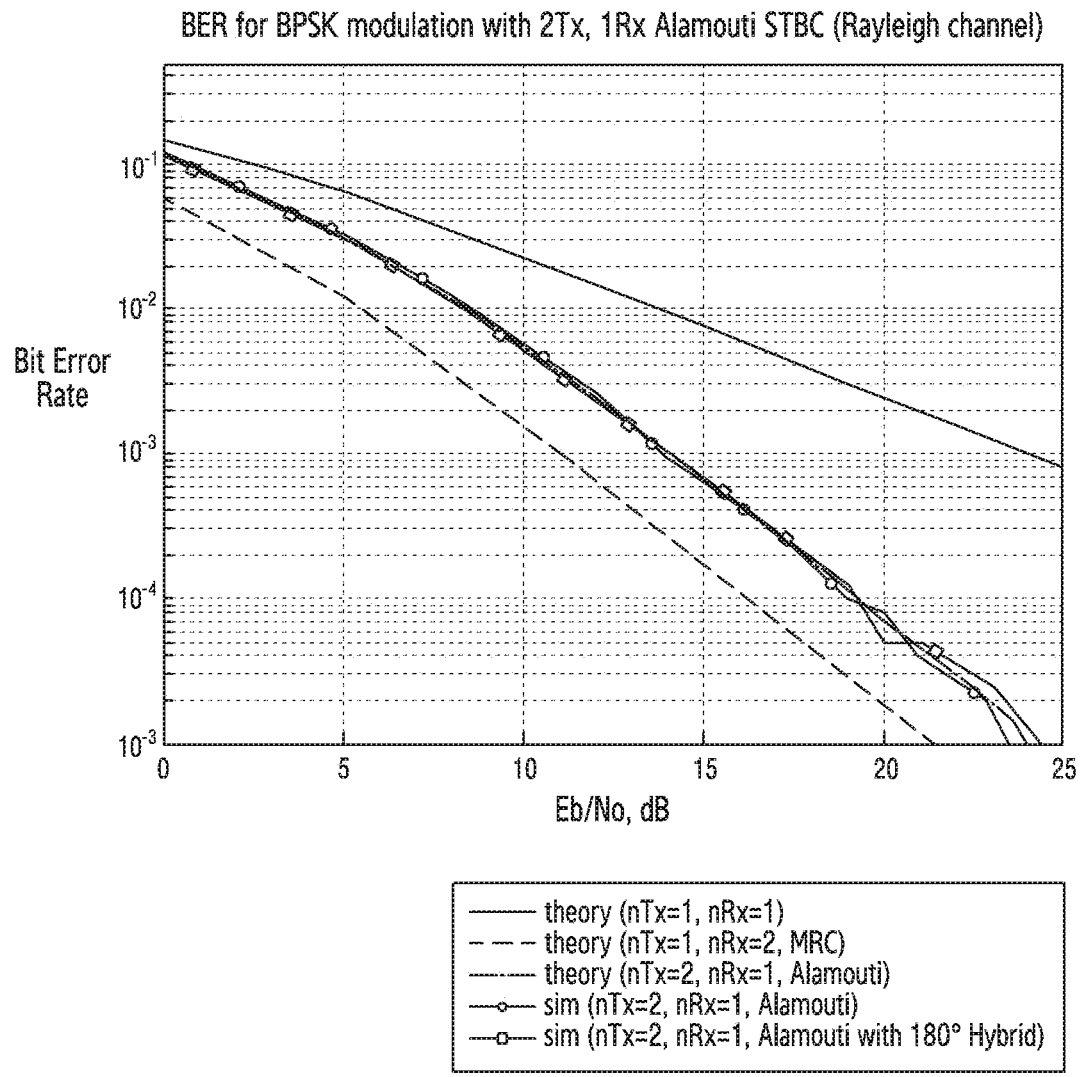
FIG. 7 is a graph illustrating comparison of a Bit Error Rate (BER) when transmission diversity is applied according to an embodiment of the disclosure.

FIG. 7 is a graph illustrating comparison of a Bit Error Rate (BER) when transmission diversity is applied according to an embodiment of the disclosure.

Referring to FIG. 7, when transmission diversity is applied in a communication system in which two transmission antennas and one reception antenna are implemented according to an embodiment, it may be noted that the BER is excellent such that a theoretical value of the existing Alamouti transmission diversity and a simulation result match (nTx=2, nRx=1, Alamouti with 180° Hybrid).

Figure 8:
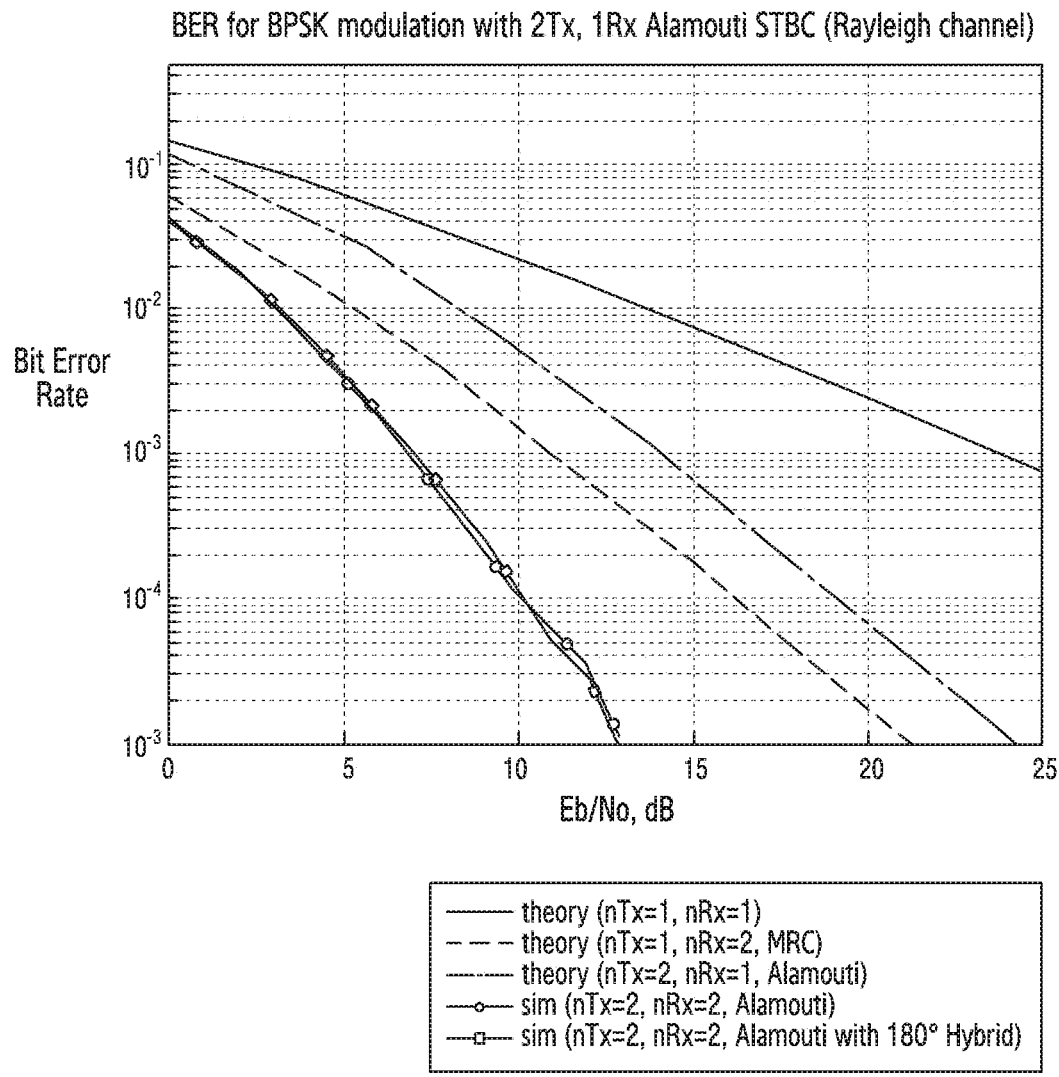
FIG. 8 is a graph illustrating comparison of a Bit Error Rate (BER) when transmission diversity is applied according to an embodiment of the disclosure.

FIG. 8 is a graph illustrating comparison of a Bit Error Rate (BER) when transmission diversity is applied according to an embodiment of the disclosure.

Referring to FIG. 8, when transmission diversity is applied in a communication system in which two transmission antennas and one reception antenna are implemented according to an embodiment, it may be noted that the BER is excellent such that a theoretical value of the existing Alamouti transmission diversity and a simulation result match (nTx=2, nRx=1, Alamouti with 180° Hybrid).

Figure 9:
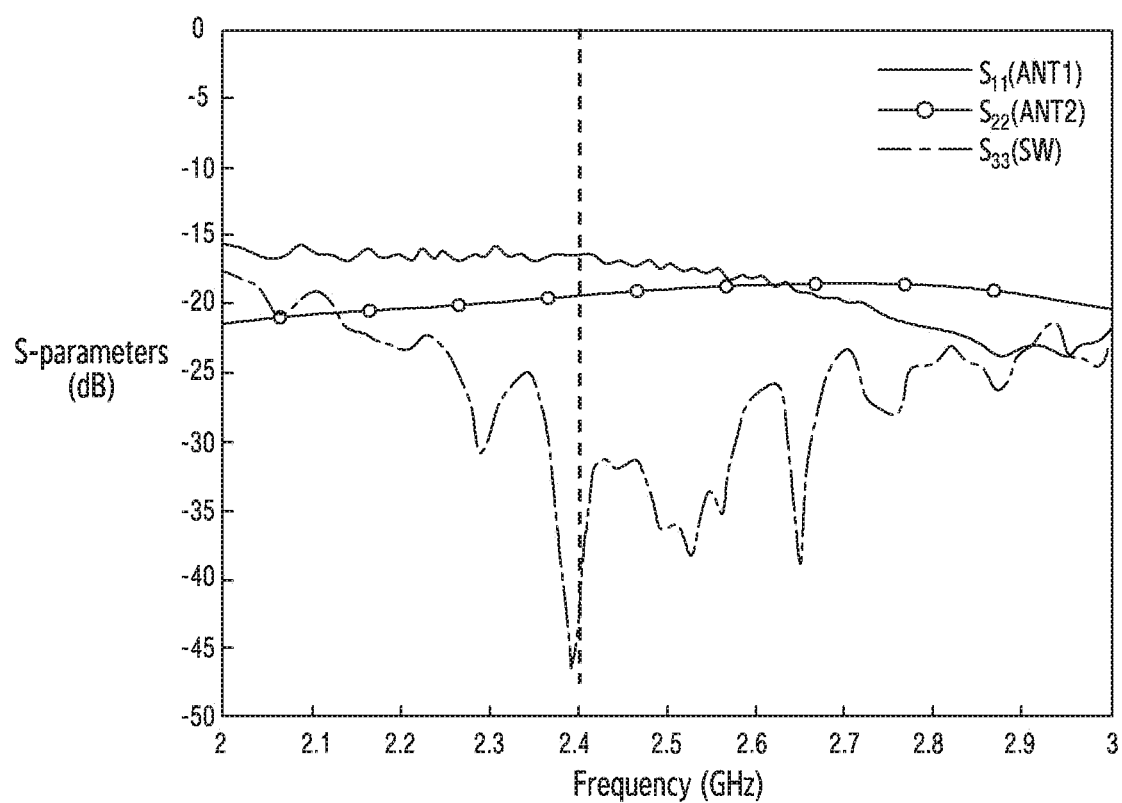
FIG. 9 is a graph illustrating a reflection loss of a phase adjustment coupler according to an embodiment of the disclosure.

FIG. 9 is a graph illustrating a reflection loss of a phase adjustment coupler according to an embodiment of the disclosure.

Figure 10:
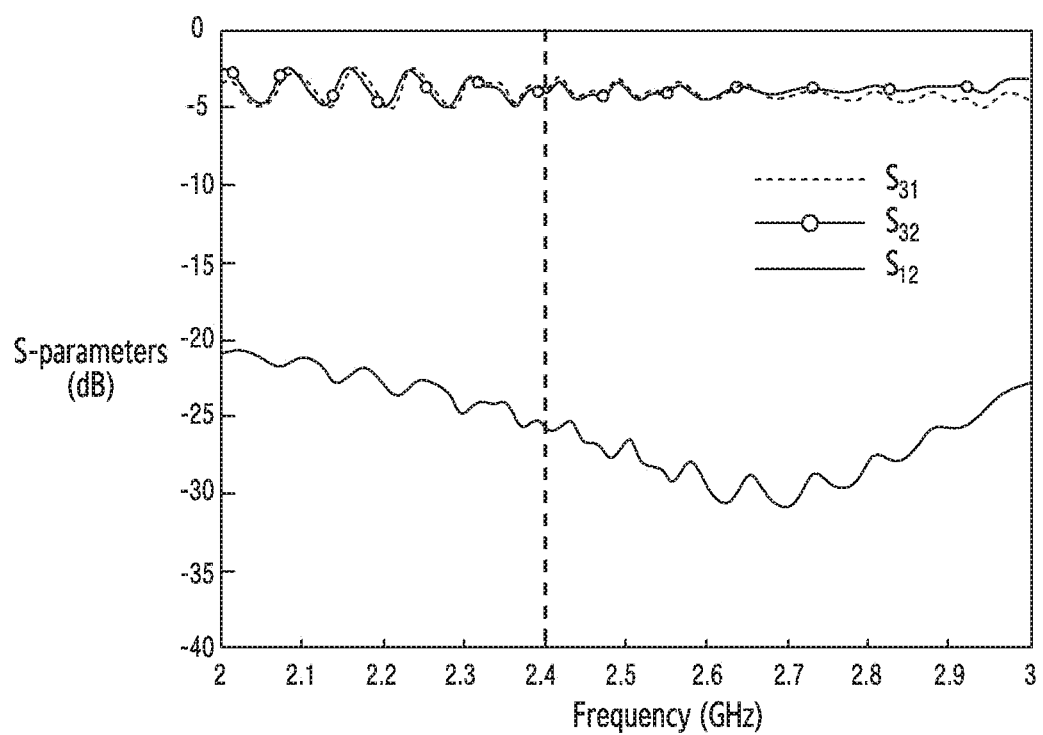
FIG. 10 is a graph illustrating an insertion loss and an isolation degree of a phase adjustment coupler according to an embodiment of the disclosure.

FIG. 10 is a graph illustrating an insertion loss and an isolation degree of a phase adjustment coupler according to an embodiment of the disclosure.

Figure 11:
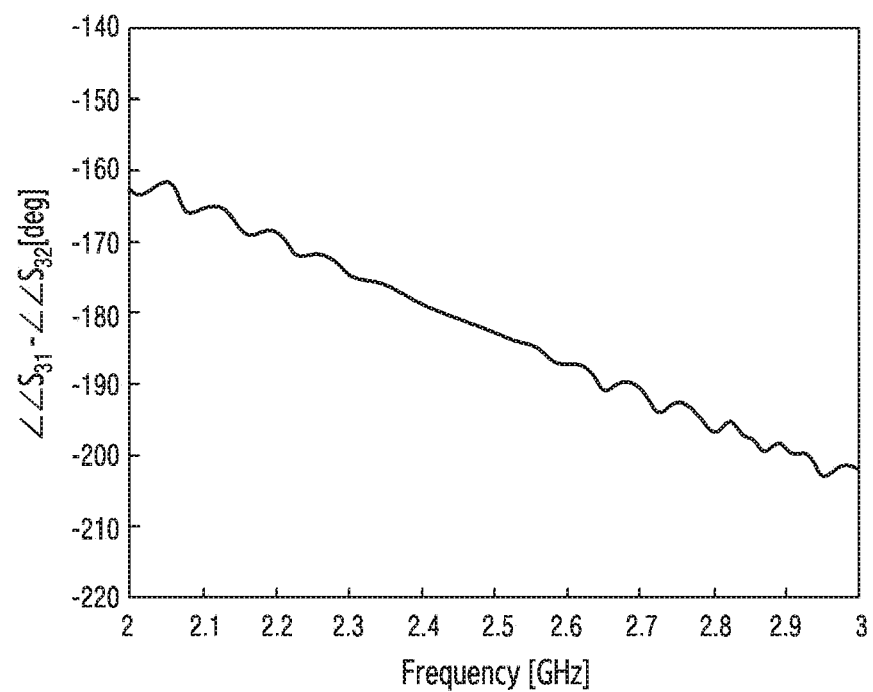
FIG. 11 is a graph illustrating a phase difference between output signals of a phase adjustment coupler according to an embodiment of the disclosure.

FIG. 11 is a graph illustrating a phase difference between output signals of a phase adjustment coupler according to an embodiment of the disclosure.

Referring to FIGS. 9 to 11, operation characteristics in 2.4 gigahertz (GHz) in the case of a phase adjustment coupler (130B of FIG. 5) according to an embodiment are illustrated.

Referring to FIG. 9, an input reflection coefficient has a characteristic equal to or lower than −15 decibels (dB) at all terminals. Referring to FIG. 10, it may be noted that an insertion loss is −3 dB according to a hybrid operation and an isolation degree between antennas is measured as −25 dB. Referring to FIG. 11, a phase difference of exactly 180 degrees may be identified in a band of 2.4 GHz.

Figure 12:
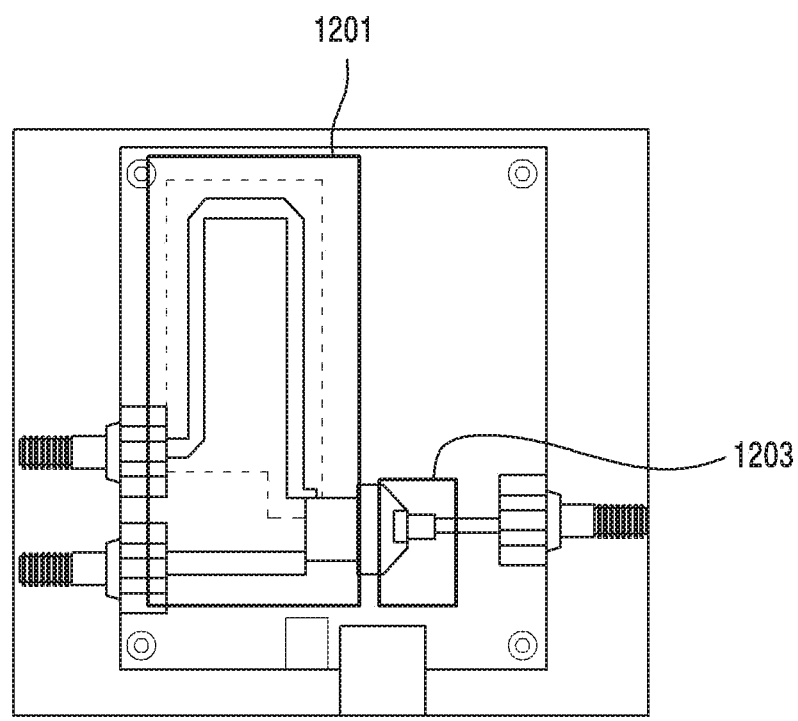
FIG. 12 illustrates actual implementation of a coupler circuit according to an embodiment of the disclosure.

FIG. 12 illustrates actual implementation of a coupler circuit according to an embodiment of the disclosure.

Referring to FIG. 12, in the case of a frequency band having a center frequency of 920 megahertz (MHz) according to an embodiment, the phase adjustment coupler 215 may be implemented as illustrated in FIG. 12. At this time, the phase adjustment coupler 215 may include a switch circuit 1201 and a coupler circuit 1203 in the form as illustrated in FIG. 4.

Figure 13:
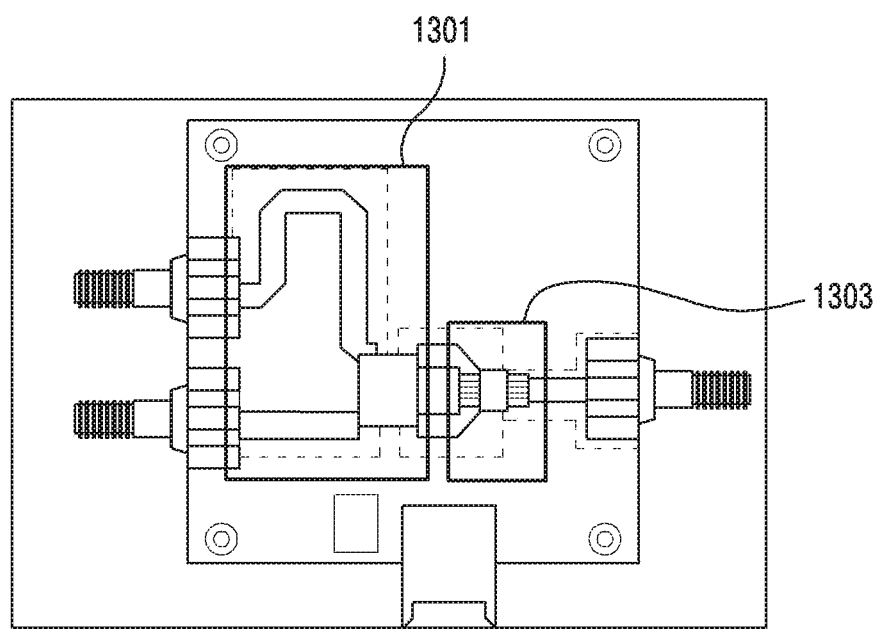
FIG. 13 illustrates actual implementation of a coupler circuit according to an embodiment of the disclosure.

FIG. 13 illustrates actual implementation of a coupler circuit according to an embodiment of the disclosure.

Referring to FIG. 13, in the case of a frequency band having a center frequency of 2.5 GHz according to an embodiment, the phase adjustment coupler 215 may be implemented as illustrated in FIG. 13. At this time, the phase adjustment coupler 215 may include a switch circuit 1301 and a coupler circuit 1303 in the form as illustrated in FIG. 12.

A method of operating a transmitter for transmission diversity in a wireless communication system according to an embodiment may include a process of generating a first data symbol by receiving a baseband signal from a data source, a process of generating a second data symbol having an equal phase to the first data symbol, a process of generating a first complex conjugate symbol by performing a complex conjugate operation for the first data symbol, a process of generating a second complex conjugate symbol having a phase difference of 180 degrees from the first complex conjugate symbol, a process of transmitting the first data symbol through a first transmission antenna and transmitting the second data symbol through a second transmission antenna in a first time slot, and a process of transmitting the first complex conjugate symbol through the first transmission antenna and transmitting the second complex conjugate symbol through the second transmission antenna in a second time slot.

According to an embodiment, the first time slot and the second time slot may be continuous time slots.

According to an embodiment, the first data symbol, the second data symbol, the first complex conjugate symbol, and the second complex conjugate symbol may be transmitted after application of a time-space block encoding.

According to an embodiment, the first data symbol and the first complex conjugate symbol may be processed or generated by a single processor for processing the baseband signal.

According to an embodiment, the first transmission antenna and the second transmission antenna may be implemented as Single Resonator Multiple Mode (SRMM) antennas.

According to an embodiment, the second data symbol may be generated via a first signal path, and the first signal path may be a signal path passing through a sum terminal of a coupler circuit.

According to an embodiment, the second complex conjugate symbol may be generated via a second signal path, and the second signal path may be a signal path passing through a difference terminal of a coupler circuit.

According to an embodiment, the method may further include a process of storing the first data symbol and a process of performing a complex conjugate operation for the stored first data symbol.

A transmitter for transmission diversity in a wireless communication system may include: a processor; a phase adjustment coupler connected to the processor to operate and including a switch circuit and a coupler circuit; and a first transmission antenna and a second transmission antenna connected to the phase adjustment coupler to operate, wherein the processor is configured to generate a first data symbol by receiving a baseband signal from a data source and generate a first complex conjugate symbol by performing a complex conjugate operation for the first data symbol, the phase adjustment coupler is configured to generate a second data symbol having an equal phase to the first data symbol and generate a second complex conjugate symbol having a phase difference of 180 degrees from the first complex conjugate symbol, the first data symbol is transmitted through the first transmission antenna and the second data symbol is transmitted through the second transmission antenna in a first time slot, and the first complex conjugate symbol is transmitted through the first antenna and the second complex conjugate symbol is transmitted through the second antenna in a second time slot.

According to an embodiment, the first time slot and the second time slot may be continuous time slots.

According to an embodiment, the first data symbol, the second data symbol, the first complex conjugate symbol, and the second complex conjugate symbol may be transmitted after application of a time-space block encoding.

According to an embodiment, the first data symbol and the first complex conjugate symbol may be processed or generated by a single processor for processing the baseband signal.

According to an embodiment, the first transmission antenna and the second transmission antenna may be implemented as Single Resonator Multiple Mode (SRMM) antennas.

According to an embodiment, the second data symbol may be generated via a first signal path, and the first signal path may be a signal path passing through a first switching node of the switch circuit and a sum terminal of the coupler circuit.

According to an embodiment, the second complex conjugate symbol may be generated via a second signal path, and the second signal path may be a signal path passing through a second switching node of the switch circuit and a difference terminal of the coupler circuit.

According to an embodiment, the processor may be configured to store the first data symbol and perform a complex conjugate operation for the stored first data symbol.

According to an embodiment, the phase adjustment coupler may be configured to couple a data symbol transmitted from the processor and adjust and output phases of the coupled data symbols.

A method of operating a receiver for transmission diversity in a wireless communication system according to an embodiment may include a process of receiving a first data symbol and a second data symbol in a first time slot, a process of receiving a first complex conjugate symbol and a second complex conjugate symbol in a second time slot, and a process of reconstructing a data symbol to which transmission diversity is applied, based on the first data symbol, the second data symbol, the first complex conjugate symbol, and the second complex conjugate symbol, wherein the first data symbol and the second data symbol have an equal phase, the first complex conjugate symbol and the second complex conjugate symbol have a phase difference of 180 degrees, and the first complex conjugate symbol is generated by performing a complex conjugate operation for the first data symbol.

According to an embodiment, the first time slot and the second time slot may be continuous time slots.

According to an embodiment, the first data symbol, the second data symbol, the first complex conjugate symbol, and the second complex conjugate symbol may be transmitted after application of a time-space block encoding.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a transmitter for transmission diversity in a wireless communication system, the method comprising:
   generating, by a processor, a first data symbol by receiving a baseband signal from a data source;
   generating, by a phase adjustment coupler operably connected to the processor and the phase adjustment coupler including a switch circuit and a coupler circuit, a second data symbol having an equal phase to the first data symbol;
   generating, by the processor, a first complex conjugate symbol by performing a complex conjugate operation for the first data symbol;
   generating, by the phase adjustment coupler, a second complex conjugate symbol having a phase difference of 180 degrees from the first complex conjugate symbol;
   transmitting, by a first transmission antenna operably connected to the phase adjustment coupler, the first data symbol through a first transmission antenna and transmitting the second data symbol through a second transmission antenna, in a first time slot; and
   transmitting, by a second transmission antenna operably connected to the phase adjustment coupler, the first complex conjugate symbol through the first transmission antenna and transmitting the second complex conjugate symbol through the second transmission antenna, in a second time slot.

2. The method of claim 1, wherein the first time slot and the second time slot are continuous time slots.

3. The method of claim 1, wherein the first data symbol, the second data symbol, the first complex conjugate symbol, and the second complex conjugate symbol are transmitted after application of a time-space block encoding.

4. The method of claim 1, wherein the first data symbol and the first complex conjugate symbol are processed or generated by a single processor for processing the baseband signal.

5. The method of claim 1, wherein the first transmission antenna and the second transmission antenna are implemented as single resonator multiple mode (SRMM) antennas.

6. The method of claim 1,
   wherein the second data symbol is generated via a first signal path, and
   wherein the first signal path is a signal path passing through a sum terminal of a coupler circuit.

7. The method of claim 1,
   wherein the second complex conjugate symbol is generated via a second signal path, and
   wherein the second signal path is a signal path passing through a difference terminal of a coupler circuit.

8. The method of claim 1, further comprising:
   storing the first data symbol; and
   performing the complex conjugate operation for the stored first data symbol.

9. A transmitter for transmission diversity in a wireless communication system, the transmitter comprising:
   a processor;
   a phase adjustment coupler connected to the processor to operate and comprising a switch circuit and a coupler circuit; and a first transmission antenna and a second transmission antenna connected to the phase adjustment coupler to operate, wherein the processor is configured to generate a first data symbol by receiving a baseband signal from a data source and generate a first complex conjugate symbol by performing a complex conjugate operation for the first data symbol, wherein the phase adjustment coupler is configured to generate a second data symbol having an equal phase to the first data symbol and generate a second complex conjugate symbol having a phase difference of 180 degrees from the first complex conjugate symbol, wherein the first data symbol is transmitted through the first transmission antenna and the second data symbol is transmitted through the second transmission antenna in a first time slot, and wherein the first complex conjugate symbol is transmitted through the first transmission antenna and the second complex conjugate symbol is transmitted through the second transmission antenna in a second time slot.

10. The transmitter of claim 9, wherein the first time slot and the second time slot are continuous time slots.

11. The transmitter of claim 9, wherein the first data symbol, the second data symbol, the first complex conjugate symbol, and the second complex conjugate symbol are transmitted after application of a time-space block encoding.

12. The transmitter of claim 9, wherein the first data symbol and the first complex conjugate symbol are processed or generated by a single processor for processing the baseband signal.

13. The transmitter of claim 9, wherein the first transmission antenna and the second transmission antenna are implemented as single resonator multiple mode (SRMM) antennas.

14. The transmitter of claim 9,
wherein the second data symbol is generated via a first signal path, and
wherein the first signal path is a signal path passing through a first switching node of the switch circuit and a sum terminal of the coupler circuit.

15. The transmitter of claim 9,
wherein the second complex conjugate symbol is generated via a second signal path, and
wherein the second signal path is a signal path passing through a second switching node of the switch circuit and a difference terminal of the coupler circuit.

16. The transmitter of claim 9, wherein the processor is further configured to:
store the first data symbol; and
perform the complex conjugate operation for the stored first data symbol.

17. The transmitter of claim 9, wherein the phase adjustment coupler is further configured to:
couple data symbols transmitted from the processor; and
adjust and output phases of the coupled data symbols.

* * * * *